United States Patent [19]

Suesse

[11] Patent Number: 4,906,227
[45] Date of Patent: Mar. 6, 1990

[54] POWER TRANSMISSION BELT CONSTRUCTION

[76] Inventor: Dale F. Suesse, P.O. Box 181, Medford, Minn. 55049

[21] Appl. No.: 310,889

[22] Filed: Feb. 16, 1989

[51] Int. Cl.$^4$ .............................................. F16G 5/10
[52] U.S. Cl. .................................... 474/265; 474/268
[58] Field of Search ............... 474/237, 240, 242, 265, 474/268, 270

[56] References Cited

U.S. PATENT DOCUMENTS

| | | | |
|---|---|---|---|
| 3,656,360 | 4/1972 | Fix | 474/265 X |
| 3,830,113 | 8/1974 | Bruns | 474/251 |
| 3,847,029 | 11/1974 | Ray | 474/265 |
| 4,002,082 | 1/1977 | Waugh | 474/250 |
| 4,034,615 | 7/1977 | Brooks | 474/250 |
| 4,254,666 | 3/1981 | Seredick | 474/253 |
| 4,264,314 | 4/1981 | Imamura | 474/205 |

Primary Examiner—Thuy M. Bui
Attorney, Agent, or Firm—Leon Gilden

[57] ABSTRACT

An endless power transmission belt is set forth for use in cooperation with a plurality of pulleys in a typical automotive environment. The belt is of a trapezoidal cross-sectional configuration including reinforcing cords running longitudinally of the axis of the belt. Further, reinforcing clips are oriented angularly overlying the top surface of the belt with prongs imbedded within the belt for securement of the clips therewithin. The clips assist in maintaining the structural integrity of the belt during use by reinforcing the top tension portion of the belt. Further, the clips are oriented at angles other than ninety degrees and in a further embodiment, are interlaced oriented orthogonally relative to one another across the top surface of the belt.

5 Claims, 1 Drawing Sheet

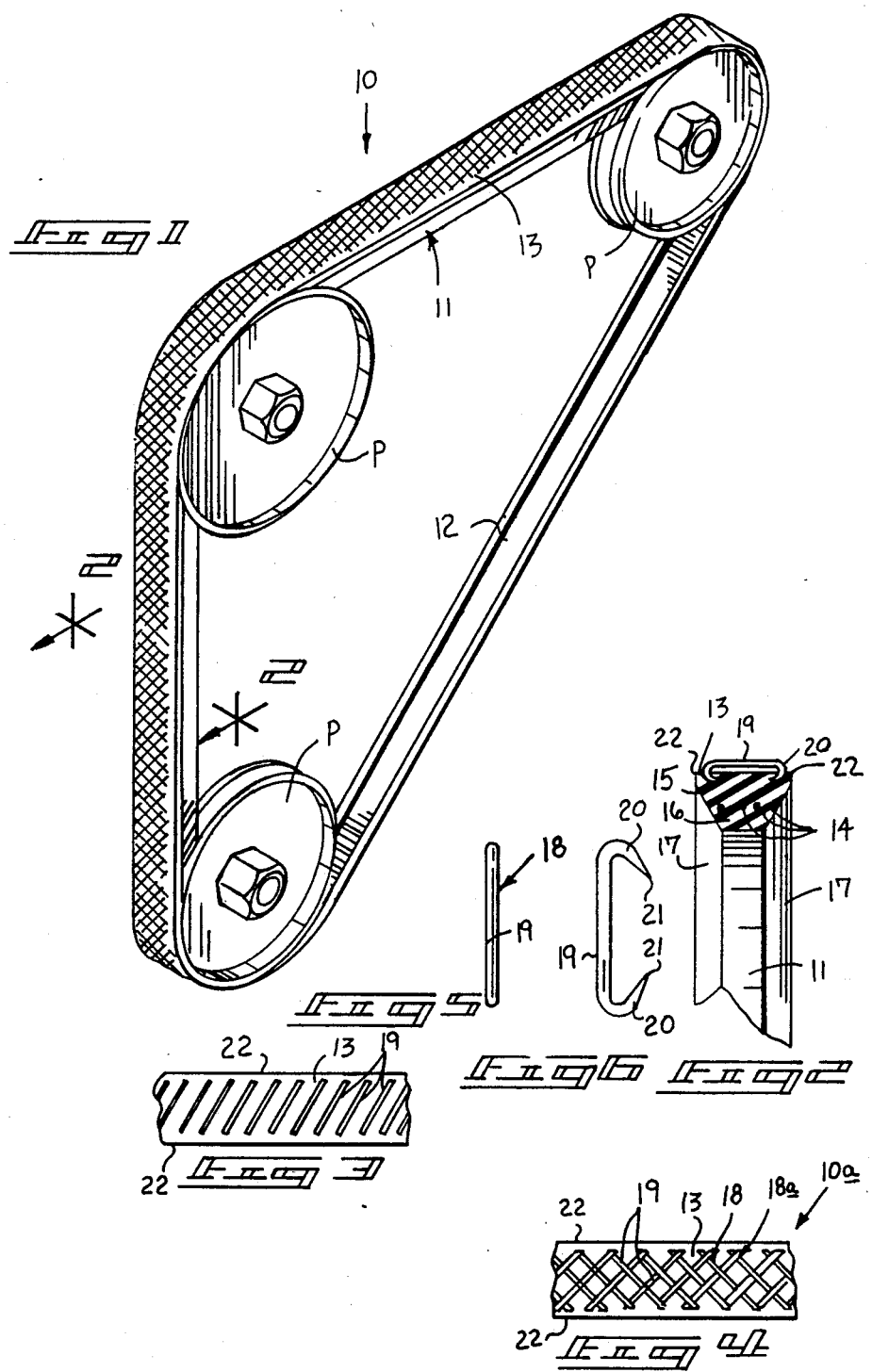

POWER TRANSMISSION BELT CONSTRUCTION

BACKGROUND OF THE INVENTION

1. Field of the Invention

The field of invention relates to power transmission belts, and more particularly pertains to a new and improved power transmission belt construction wherein the same provides for a series of reinforcing clips overlying the top surface of the belt for reinforcing the belt and further providing an aesthetically pleasing appearance of the belt.

2. Description of the Prior Art

Power transmission belts, and particularly those for use in automotive environments, are well known in the prior art. The belts of the prior art have utilized various structural features to assist in maintaining the integrity of the belt during use. For example, U.S. Pat. No. 3,830,113 to Bruns sets forth a power transmission belt of trapezoidal cross-sectional configuration wherein the pitch line of the belt is disposed below the transverse center plane of the belt positioning the tension section in driving contact rather than the compression section of the belt. The patent to Bruns is cited for indication of conventional belt construction.

U.S. Pat. No. 4,002,082 to Waugh sets forth an endless transmission belt formed with a plurality of contact teeth within the bottom surface of the belt including at least one groove extending through the teeth to assist in adhesion of the belt during use and assist in noise reduction of the belt in use.

U.S. Pat. No. 4,034,615 to Brooks sets forth an endless elastomeric transmission belt wherein the grooves formed within the bottom compression surface of the belt are oriented at angles other than 90 degrees relative to the sides of the belt to minimize noise generation by the grooves during use. The Brooks patent, as well as the other patents cited, fails to provide the reinforcement of the tension portion of the belt, as set forth by the instant invention.

U.S. Pat. No. 4,254,666 to Seredick sets forth an adjustable "V" belt wherein the "V" belt is formed with a coupling member at the ends thereof to provide an adjustable "V" belt for securement about associated pulleys when required as an emergency replacement belt during breakage of the original belt.

U.S. Pat. No. 4,264,314 to Imamura sets forth an endless belt utilizing a plurality of grooves formed at the bottom surface thereof wherein the grooves are perpendicular to the longitudinal axis of the belt wherein groove pitch, groove depth and groove angles are randomly changed throughout the belt to decrease the noise level generated by the belt during use.

As such, it may be appreciated that there is a continuing need for a new and improved power transmission belt wherein the same addresses both the problems of an enhanced strength and aesthetically appealing organization and as such, the present invention substantially fulfills this need.

SUMMARY OF THE INVENTION

In view of the foregoing disadvantages inherent in the known types of power transmission belts now present in the prior art, the present invention provides a power transmission belt wherein the same provides for enhanced strength of the belt over conventional belt construction and further provides an aesthetically appealing appearance during use to cooperate with other engine components, such as valve covers, air cleaner canisters, and the like, to provide enhanced overall pleasing appearance. As such, the general purpose of the present invention, which will be described subsequently in greater detail, is to provide a new and improved power transmission belt which has all the advantages of the prior art power transmission belts and none of the disadvantages.

To attain this, the present invention comprises a power transmission belt construction wherein the same includes an endless belt formed of flexible material to accommodate a circuitous path. The belt is formed with longitudinally oriented reinforcing cords defining an overlying tension section and underlying compression section to define a trapezoidal cross-sectional configuration of the belt. The top surface of the belt overlying the tension section includes a series of spaced parallel "C" shaped clips formed with pointed legs imbedded within the belt with the main body of the clip overlying the top surface of the belt. The clips are oriented at angles other than ninety degrees relative to the sides of the belt and include an interlaced construction to provide an enhanced reinforcement of the belt as well as an aesthetically pleasing appearance of the belt.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved power transmission belt which has all the advantages of the prior art power transmission belts and none of the disadvantages.

It is another object of the present invention to provide a new and improved power transmission belt which may be easily and efficiently manufactured and marketed.

It is a further object of the present invention to provide a new and improved power transmission belt which is of a durable and reliable construction.

An even further object of the present invention is to provide a new and improved power transmission belt which is susceptible of a low cost of manufacture with regard to both materials and labor, and which accordingly is then susceptible of low prices of sale to the consuming public, thereby making such power transmission belts economically available to the buying public.

Still yet another object of the present invention is to provide a new and improved power transmission belt which provides in the apparatuses and methods of the prior art some of the advantages thereof, while simultaneously overcoming some of the disadvantages normally associated therewith.

Still another object of the present invention is to provide a new and improved power transmission belt construction wherein the same is provided with "C" shaped clips overlying the top surface of the belt to enhance the constructional integrity of the belt and further provide an aesthically pleasing appearance during use.

These together with other objects of the invention, along with the various features of novelty which characterize the invention, are pointed out with particularity in the claims annexed to and forming a part of this disclosure. For a better undertanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic view taken along the lines 2—2 of FIG. 1 in the direction indicated by the arrows.

FIG. 3 is a top orthographic view of a segment of the belt.

FIG. 4 is a top orthographic view of a further embodiment of the belt construction.

FIG. 5 is a top orthographic view of a clip utilized by the instant invention.

FIG. 6 is an orthographic side view taken in elevation of a clip utilized by the instant invention.

DESCRIPTION OF THE PREFERRED EMBODIMENT

With reference now to the drawings, and in particular to FIGS. 1 to 6 thereof, a new and improved power transmission belt construction embodying the principles and concepts of the present invention and generally designated by the reference numeral 10 will be described.

More specifically, it will be noted that the power transmission belt 10 essentially comprises a continuous flexible belt 11 of a trapezoidal cross-sectional configuration which in use is secured about a predetermined array of pulleys "P". The construction of the belt includes polymeric material to enable the flexibility and sustained longevity of the belt in use. The belt 11 includes a pulley contacting continuous bottom surface 12 underlying and parallel to a continuous top surface 13. Reinforcing cords 14 are arranged longitudinally of the axis of the belt 11 and demarcates an overlying tension section 15 and an underlying compression section 16. The belt 11 further includes tapered side walls 17 tapering downwardly from the top surface 13 to the bottom surface 12.

A first array of "C" shaped reinforcing clips 18 are illustrated in a first pattern, as illustrated in FIG. 3, wherein the clips are arranged parallel to one another and nonorthogonally to the side wall 17 with a forty-five degree included angle preferred. The reinforcing clips 18 are formed with an elongate body 19 terminating in arcuate legs 20 at either end thereof wherein the arcuate legs include pointed terminal ends 21 for securement through the top surface 13 of the belt 11. The clips are further preferably formed of the generic composition of steel known as stainless steel to enhance their corrosion resistant properties and longevity in a typical automotive environment. The "C" shaped clips 18 are positioned within and spaced from the top edges 22 of the top surface 13 to avoid contact of the clips with any of the pulleys "P".

FIG. 4 illustrates a further construction of the belt defined by a belt 10a with a similar top surface 13 in construction, as illustrated in FIG. 2. The transmission belt 10a includes an interlaced matrix of clips including a first series of "C" shaped clips 18 with a second series of "C" shaped clips 18a positioned orthogonally relative to the first array of "C" shaped wherein the second array of clips 18a are parallel to one another to define a continuous matrix of interlaced clips, as illustrated.

As to the manner of usage and operation of the elastomeric continuous belt of the instant invention, the same should be apparent from the above disclosure and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A power transmission belt of endless, flexible elastomeric construction, comprising,
   a top surface overlying and parallel to a bottom surface with tapered side walls depending inwardly from the top surface to the bottom surface defining top parallel edges at the intersection of the side walls and the top surface, and
   reinforcing means spaced from the top parallel edges for maintaining structural integrity of the belt, and wherein the reinforcing means are spaced inwardly of the top parallel edges and wherein the reinforcing means are defined as "C" shaped clips.

2. A power transmission belt as set forth in claim 1 wherein the "C" shaped clips are arranged parallel to one another continuously along the top surface.

3. A power transmission belt as set forth in claim 2 wherein the "C" shaped clips are defined with a main body and arcuate legs, said arcuate legs terminating in pointed ends with said pointed ends directed interiorly of the belt throughout the top surface with the main body overlying the top surface.

4. A power transmission belt as set forth in claim 3 wherein the "C" shaped clips are arranged non-orthogonally relative to the top parallel edges.

5. A power transmission belt as set forth in claim 4 including further reinforcing clips arranged orthogonally and interlaced with the "C" shaped clips and wherein the further reinforcing clips are of a "C" shaped configuration and arranged parallel to one another.

* * * * *